Dec. 17, 1946.   D. PACKARD ET AL   2,412,745
WELDING SYSTEM
Filed Dec. 17, 1943
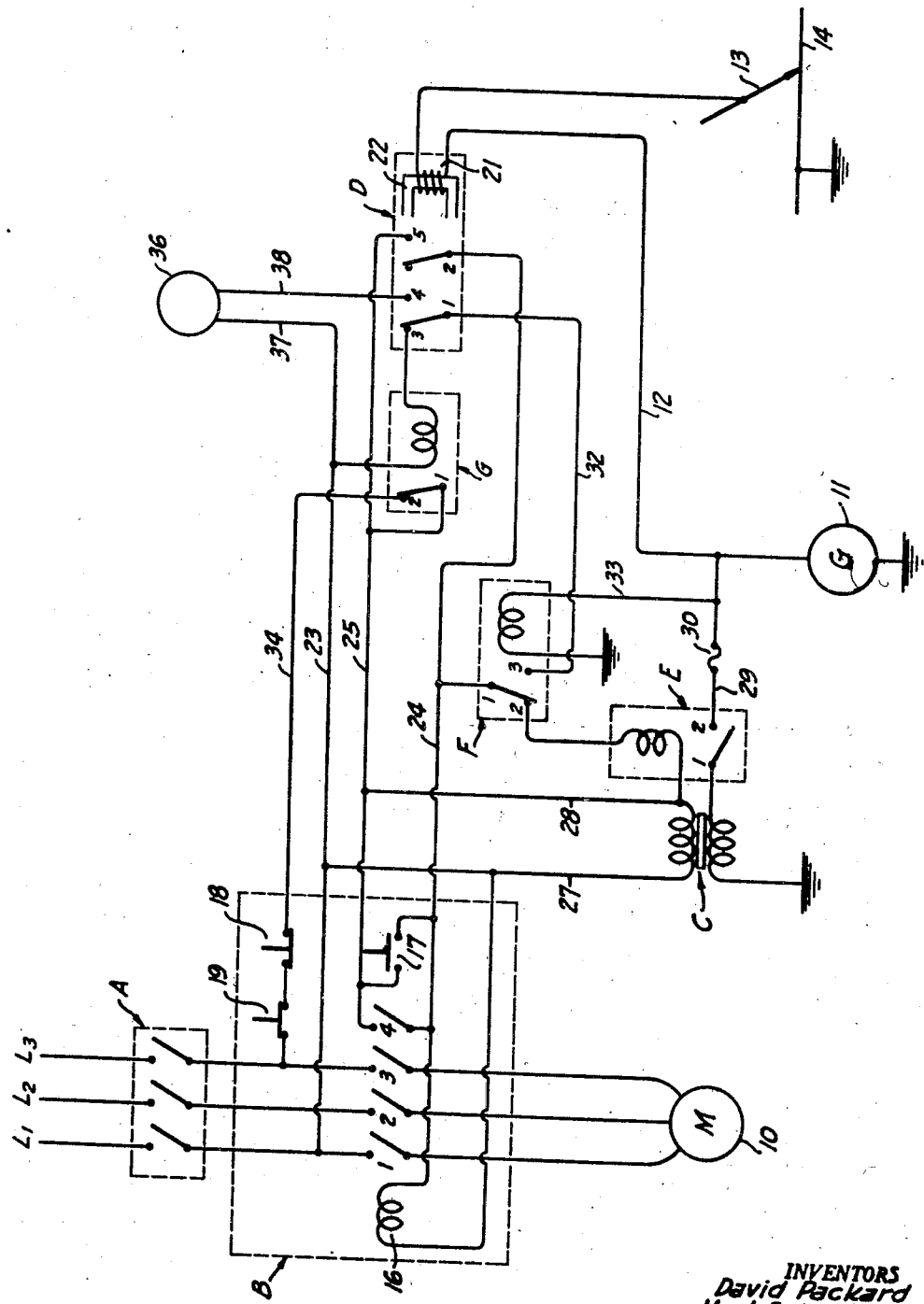
INVENTORS
David Packard
Noel E. Porter
BY
Paul O. Fehr
ATTORNEY Patented Dec. 17, 1946

2,412,745

UNITED STATES PATENT OFFICE 2,412,745

WELDING SYSTEM

David Packard, Palo Alto, and Noel E. Porter, Berkeley, Calif., assignors to Hewlett-Packard Company, Palo Alto, Calif., a copartnership consisting of William R. Hewlett and David Packard Application December 17, 1943, Serial No. 514,648

4 Claims. (Cl. 171—97)

This invention relates generally to electric arc welding systems of the motor generator type, and particularly to welding systems adapted for automatic control.

In welding systems of the above type it is conventional practice to make use of a starter switch in the alternating current supply lines to the motor, and with this switch having control circuits conditioned by start and stop contacts for closing and opening the main contacts. Control devices have been incorporated in such systems for causing the starting switch to be opened automatically when welding operations are discontinued for a predetermined time period, and for causing automatic closing of the starter switch with resultant starting of the motor generator in operation responsive to shorting the welding rod upon the work preparatory to striking an arc. Systems of this type which have been developed in the past have been unduly complicated, and have generally required direct interruption of the welding circuit by means of heavy duty switch contacts. Furthermore prior systems have not been readily adaptable to various prevailing commercial types of motor generator welding equipment.

It is an object of the present invention to provide a simple and effective system of the above character, which is characterized by an absence of contacts for interrupting the welding circuit.

Another object of the invention is to provide a system of the above character which can be readily applied to prevailing types of welding equipment.

A further object of the invention is to provide a novel arrangement for indicating or registering the total arc time of the system over an extended time period of operation.

Further objects and features of the invention will appear from the following description in which the preferred embodiment has been set forth in detail in conjunction with the accompanying drawing.

The system as illustrated in the drawing consists of an alternating current motor 10 which drives the direct current welding generator 11. Alternating current supply lines L1, L2 and L3 supply current to the motor 10 through the line switch A and starter switch B. One side of the generator 11 is shown grounded and the other side is connected to the welding conductor 12, which extends to the welding wire or rod 13. The work or object 14 being welded is likewise shown as grounded to complete the welding circuit.

The starting switch B may vary in construction, but in general it consists of contact sets 1, 2, 3 and 4 which are moved to closed position upon energizing the operating coil 16. Manually operated start and stop contacts 17 and 18 serve to initiate closing and opening of the main switch contacts through the action of coil 16. In addition it is customary to provide overload release contacts 19 in series with contacts 18.

In the present instance the control circuits of the starter switch are electrically related to the welding circuit through means including the transformer C, and the magnetic relay or switch D. In addition supplemental relays E, F and G are provided for functions which will be presently explained.

The relay D is constructed with an operating coil 21 of relatively low resistance and reactive impedance, whereby it can be connected permanently in series with the welding circuit 12. In practice a magnetic core 22 has been employed, with the heavy welding conductor 12 simply looped through one leg of this core, as illustrated diagrammatically.

One side of the coil for relay G is shown connected to contact 3 of relay A, and the other side of this coil connects to conductor 23, which extends to the line L1. Contact 2 of relay G is connected by conductor 24 to one of the set of contacts 4 of the starter switch B. Contact 5 of relay G is connected by conductor 25 to the other side of the contact set 4.

Transformer C has its primary terminals connected to conductors 23 and 24 by conductors 27 and 28. One side of the secondary of this transformer is grounded, and the other side connects through conductor 29 with the welding circuit conductor 12. Contacts 1 and 2 of relay E are connected in series with conductor 29. Also a series protective fuse 30 can be provided.

The operating coil of relay E has its one side connected to conductor 28, and its other side to the contact 2 of relay F. Contact 1 of relay F is in turn connected to conductor 24. Contact 3 of relay F is connected by conductor 32 to contact 1 of relay D. The operating coil of relay F has its one side grounded and its other side connected by conductor 33 to the welding conductor 12.

Conductor 34, which leads from the starter switch and is in series with the stop contact 18, is connected to contact 2 of relay G. Contact 1 of this relay is connected to conductor 25.

In addition to the equipment referred to above the system preferably includes a totalizing device 36 connected by conductors 37 and 38 to conductor 23 and to contact 4 of relay D. This totalizer can be any suitable counting or time indicating device, consisting for example of a constant speed synchronous motor driving suitable counting means.

Relay G is a time delay device constructed so that upon energizing its operating coil the contacts 1 and 2 are opened after a predetermined time period of continuous excitation. Should current through the coil of this device be interrupted momentarily, the device is automatically reset, whereby thereafter continuous excitation for the entire period of delay is required. Time delay relays of this type are well known in the art, and can consist for example of a small self-starting synchronous motor, geared to open the contact after a predetermined period of continuous operation, and with provision for automatically interrupting the gear train to permit immediate resetting when excitation is interrupted.

The relay F, which can be termed a protective relay, is adapted for direct current operation at a potential below that normally maintained across the welding arc. For example with a welding generator adapted to maintain about 25 volts across the arc during normal welding operations, the relay can be wound to operate at a potential of about 10 volts.

Operation of the system described above can be outlined as follows: With the line switch A open the system is completely deenergized. Upon closing the line switch A transformer C is energized, relay E is energized to maintain its contacts 1 and 2 closed, and potential from the secondary of transformer C is applied to the welding conductor 12. The circuit for energizing the transformer C can be traced from line L1, conductor 23, conductors 27 and 28, conductor 25, ductor 23, conductors 27 and 28, conductor 25, contacts 1 and 2 of delay relay G, conductor 34 and contacts 18 and 19 which connect to line L3. The coil of relay E is energized in that its one side connects with conductor 28, and its other side connects through closed contacts 1 and 2 of relay F, conductor 24, and coil 16, which in turn connects to conductor 27. The impedance of the coil for relay E is such that the current flow through coil 16 is insufficient to operate the starter switch. Relay D remains deenergized, and totalizer 36 is not energized because contacts 1 and 4 are open.

To start the motor generator in operation the operator short circuits the welding rod 13 upon the work 14. This causes a momentary surge of current from transformer C through the coil 21 of relay D, thereby causing the closing of contacts 1 and 4, and also contacts 2 and 5. Closing of contacts 2 and 5 of relay D effectively short circuits the starting contacts 17. This causes the coil 16 of the starting switch to be energized with sufficient current to cause the contact sets, 1, 2, 3 and 4, to be closed. Closing of contacts 4 short circuits or locks out the starting contacts 17, and also the contacts 2 and 5 of relay D. Thus while the motor is being started in operation, the transformer C need not continue to supply sufficient current to coil 21 to maintain relay D energized. Simultaneously with relay D being energized the coil of relay E is deenergized to open its contacts 1 and 2 and thus interrupt the secondary circuit of transformer C. This occurs because the coil of relay E is shorted out by the closing of contacts 2 and 5 of relay D. As the direct current potential from generator 11 builds up, relay F is energized to close its contacts 1 and 3 and to open its contacts 1 and 2. Opening of contacts 1 and 2 insures deenergization of relay E irrespective of momentary deenergization of relay D.

When the motor generator reaches normal speed the operator draws an arc between the work and the welding rod 13, and proceeds with normal welding operations. The welding current maintains the relay D energized, with contacts 1 and 4 closed to supply alternating current to the totalizer 36, but the winding of delay relay G is deenergized by virtue of contacts 1 and 3 being open. The welding equipment remains in this condition as long as normal welding proceeds. Should welding operations be interrupted relay D is deenergized with the result that contacts 1 and 3 are closed, and contacts 1 and 4, together with contacts 2 and 5, are opened. This results in energizing the delay relay G, but does not immediately alter the closed condition of the starting switch B. Should welding be resumed before a sufficient time has lapsed for relay G to open its contacts 1 and 2, then relay D is again energized, and the winding of delay relay G deenergized whereby the motive element of the same is restored to its initial position. If the welding current is interrupted for a period of time equal to that to which the delay relay G is adjusted, then the contacts 1 and 2 of the delay relay are opened, with the result that flow of current through coil 16 is interrupted, and the starting switch B is immediately opened to discontinue supply of current to the motor 10. Before the motor generator comes to rest the voltage applied to the winding of relay F drops sufficiently to cause opening of contacts 1 and 3 and closing of contacts 1 and 2. The system is now ready for restarting in the manner previously described, that is by shorting the rod 13 upon the work 14.

It will be noted from the above that the totalizer 36 is connected and is in operation only during periods of arc welding, when normal welding current is flowing through the welding circuit. Therefore over a considerable period of time the readings of this device will be cumulative and will show the total period of arc welding time for which the machine was in use. It is necessary that there be a substantial voltage across the arc, as well as a flow of welding current, for the totalizer to operate. This is because relay F must be energized as well as relay D, for current to be supplied to the totalizer. Relay F is deenergized if the welding rod is shorted to the work, because at that time the voltage across the arc is reduced to zero or to a value so low that relay F is not energized. Thus the totalizer does not count or record time when the arc is not in actual working operation.

The complication of a breaker switch in the welding circuit itself is completely eliminated with the present system, and relay D may be of relatively light construction, with its contacts designed to handle the relatively small currents required. Relay F in conjunction with relay E insures an open secondary circuit for the transformer C during normal welding operations, thus protecting the transformer against unduly heavy loads by virtue of the low impedance of the welding circuit to ground.

It will be evident that our invention is applicable to various makes of motor generator equipment having various types of starting switches. Such circuit changes as are required for different types of starting switches will be apparent t those skilled in the art, and will not alter the principle of operations.

We claim:

1. In a welding system of the type having a motor connected to alternating current supply lines through a starter switch, a direct current generator driven by the motor and connected to an arc welding circuit, the starter switch having provision for automatically closing and opening the same in response to the closing and opening of control circuits, a relay having a low impedance energizing coil in series with the welding circuit, connections between contacts of the relay and the control circuits of the starter switch for causing the starter switch to be automatically closed when the series winding is energized by normal welding current, means connecting the contacts of said relay with the control circuits of the starter switch for effecting automatic opening of the starter switch after a predetermined time period, following interruption of welding current, means for supplying an initial operating current to the winding of said relay to operate the same upon shorting the welding circuit prior to starting the motor generator in operation, said means including a transformer having its primary arranged to receive current from the alternating current supply lines and having its secondary connected to apply current to the welding circuit, and means for interrupting the secondary of the transformer during normal welding operations.

2. In a welding system of the type having a motor connected to alternating current supply lines through a starter switch, a direct current generator driven by the motor and connected to an arc welding circuit, the starter switch having provision for automatically closing and opening the same in response to the closing and opening of control circuits, a relay having a low impedance energizing coil in series with the welding circuit, connections between contacts of the relay and the control circuits of the starter switch for causing the starter switch to be automatically closed when the series winding is energized by normal welding current, means connecting the contacts of said relay with the control circuits of the starter switch for effecting automatic opening of the starter switch after a predetermined time period, following interruption of welding current, means for supplying an initial operating current to the winding of said relay to operate the same upon shorting the welding circuit prior to starting the motor generator in operation, said means including a transformer having its primary arranged to receive current from the alternating current supply lines and having its secondary connected to apply current to the welding circuit, a relay having its contacts in series with the secondary of the transformer whereby the secondary circuit of the transformer is interrupted by deenergizing the coil of such relay, an energizing circuit for said last named relay, and an additional relay having its coil connected to receive direct current from the welding circuit and adapted to interrupt the energizing circuit of the last named relay.

3. In a welding system of the type having a motor connected to alternating current supply lines through a starter switch and a direct current generator driven by the motor and connected to an arc welding circuit, the starter switch having control circuits for causing closing and opening of the switch in response to closing and opening of start and stop contacts; relay means connected to the control circuits of the starter switch for effecting automatic starting of the motor upon short circuiting the welding circuit, a totalizing device, an energizing circuit for the totalizing device, and relay means having contacts serving to open or close the energizing circuit, said relay means being responsive to close the energizing circuit when welding current is normally flowing in the welding circuit, and serving to open the energizing circuit both when no current is flowing through the welding circuit and when the welding circuit is short circuited.

4. In a welding system of the type having a motor connected to alternating current supply lines through a starter switch and a direct current generator driven by the motor and connected to an arc welding circuit, the starter switch having control circuits for causing closing and opening of the switch in response to closing and opening of control circuits, a relay having a low impedance energizing coil in series with the welding circuit, connections between contacts of the relay and the control circuits of the starter switch for causing the starter switch to be automatically closed when said relay coil is energized by normal welding current, means for connecting certain contacts of said relay with the control circuits of the starter switch for effecting automatic opening of the starter switch after a predetermined time period following interruption of normal welding current, means for supplying an initial operating current to the coil of said relay to operate the same upon shorting the welding circuit prior to starting the motor generator in operation, said means including a transformer having its primary arranged to receive current from the alternating current supply lines and having its secondary connected to apply current to the welding circuit, a relay having a set of contacts in series with the secondary of the transformer whereby the secondary circuit of the transformer is interrupted by deenergizing the coil of such relay, an energizing circuit for said last named relay, an additional relay having its coil connected to receive direct current from the welding circuit and having a set of contacts adapted to interrupt the energizing circuit of the last named relay, the coil of the additional relay being deenergized when the welding circuit is shorted and being energized during normal arc welding operations, said additional relay having supplemental contacts which are closed when the coil of the same is energized, said first named relay having supplemental contacts closed when the coil of the same is energized by normal welding current, a totalizing device, and an energizing circuit for the totalizing device, said energizing circuit including in series with the same the aforesaid supplemental contacts whereby said totalizing device is energized only during normal arc welding operations and is deenergized upon interruption of the welding current or upon short circuiting of the welding circuit.

DAVID PACKARD.
NOEL E. PORTER.